FIG. IA

INVENTORS.
NEIL C. SHER
RICHARD C. MORTON
BY Charles J. Ungemach
ATTORNEY

INVENTORS.
NEIL C. SHER
RICHARD C. MORTON

United States Patent Office 3,478,731
Patented Nov. 18, 1969

3,478,731
ENGINE STARTUP SEQUENCE CONTROL
APPARATUS
Richard C. Morton, South St. Paul, and Neil C. Sher, St. Paul, Minn., assignors to Honeywell Inc., Minneapolis, Minn., a corporation of Delaware
Filed Aug. 8, 1966, Ser. No. 570,833
Int. Cl. F02d 37/00
U.S. Cl. 123—198                 8 Claims

ABSTRACT OF THE DISCLOSURE

A fluidic engine control system which provides automatic startup sequence control. This system also operates to shut down the engine in case a parameter assumes an abnormal value and to indicate the parameter responsible for the shut down. The system comprises a series of fluidic control assemblies, each controlling an engine variable. Operation of succeeding assemblies is initiated by means of signals received from preceding assemblies through signal delay devices.

---

This invention relates to control apparatus and more particularly to apparatus for automatically controlling the starting of a device such as an engine powered compressor.

Prior to automatically starting such a device, it is desirable to know that certain parameters such as gas supply pressure, lubricating oil pressure and the like are within acceptable limits. The present invention operates to check these parameters prior to starting and to prevent automatic starting procedures if the value of any parameter is found to lie outside of its limit. Of course, certain parameters such as oil pressure normally have values, when the engine is stopped, which would be intolerable when the engine is running. The present invention, although checking these parameters for supervision of the device in its operating condition, does not allow an unacceptable initial value of such parameter to prevent automatic starting to be initiated.

In such an engine, the gas supply pressure, pre-lube oil pressure, lube oil pressure, and engine vibration as well as other parameters, all vary within known ranges during proper engine operation. The reaching of an extreme value of any of these parameters during the operation of the engine will result in a signal calling for the shutdown of the engine to avoid damage to the engine. A system for disclosing extreme values of certain parameters and calling for the shutdown of the engine is disclosed in copending application Ser. No. 481,674, filed Aug. 23, 1965, and assigned to the assignee of the present invention.

Once a shutdown has occurred and the fault has been corrected, the engine is ready for restarting. It is desirable to perform this restarting function by some type of an automatic sequencing system since a number of steps or prerun events should be performed before the engine will begin running. The sequencing system which constitutes the present invention is described below and includes means for automatically performing such a series of prerun events that result in the starting and running of an engine.

Typically, one embodiment of the present invention includes means for determining if the apparatus is in a condition for starting, means for initiating a first prerun event, means for initiating a second prerun event, means for initiating a third prerun event, means for initiating a fourth prerun event and means for terminating prerun events that are not necessary to the running of the engine.

The sequencing system disclosed is a fluidic system, that is, almost all functions are accomplished by control of fluid flow. Only very few moving mechanical parts are used and these are parts of the apparatus to be controlled, or are manually actuated components.

For a better understanding of this invention and its advantages, a reference should be had to the sub-joined drawing, which form a part hereof, and to the accompanying descriptive matter, in which there is illustrated and described a preferred embodiment of the invention.

The single figure of the drawing, including parts A, B and C, shows the invention schematically as applied in the natural gas industry to a compressor. The system is simplified for ease of comprehension to show only four variable parameters being supervised and only four means that need to be actuated before the engine starts running. A typical set of prerun events necessary to starting the engine are: (1) starting a lube pump, (2) opening a gas starter valve, (3) opening a main gas valve, and (4) closing an ignition switch which ignites the gas in the engine. Once the engine is running, a further function is performed by the sequencing system resulting in shutting off the lube pump, closing the gas starter valve, and shutting off the ignition switch, since these are necessary only during starting of the engine.

Figure 1A:
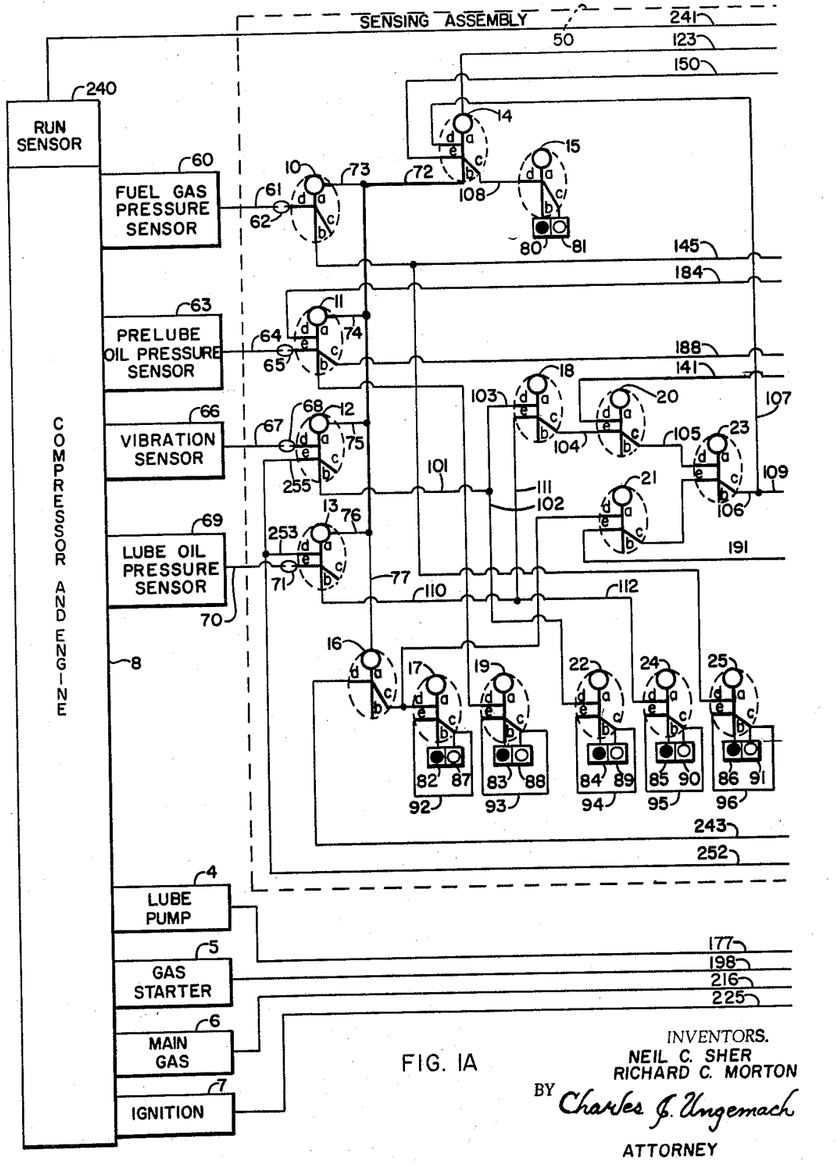
Figure 1B:
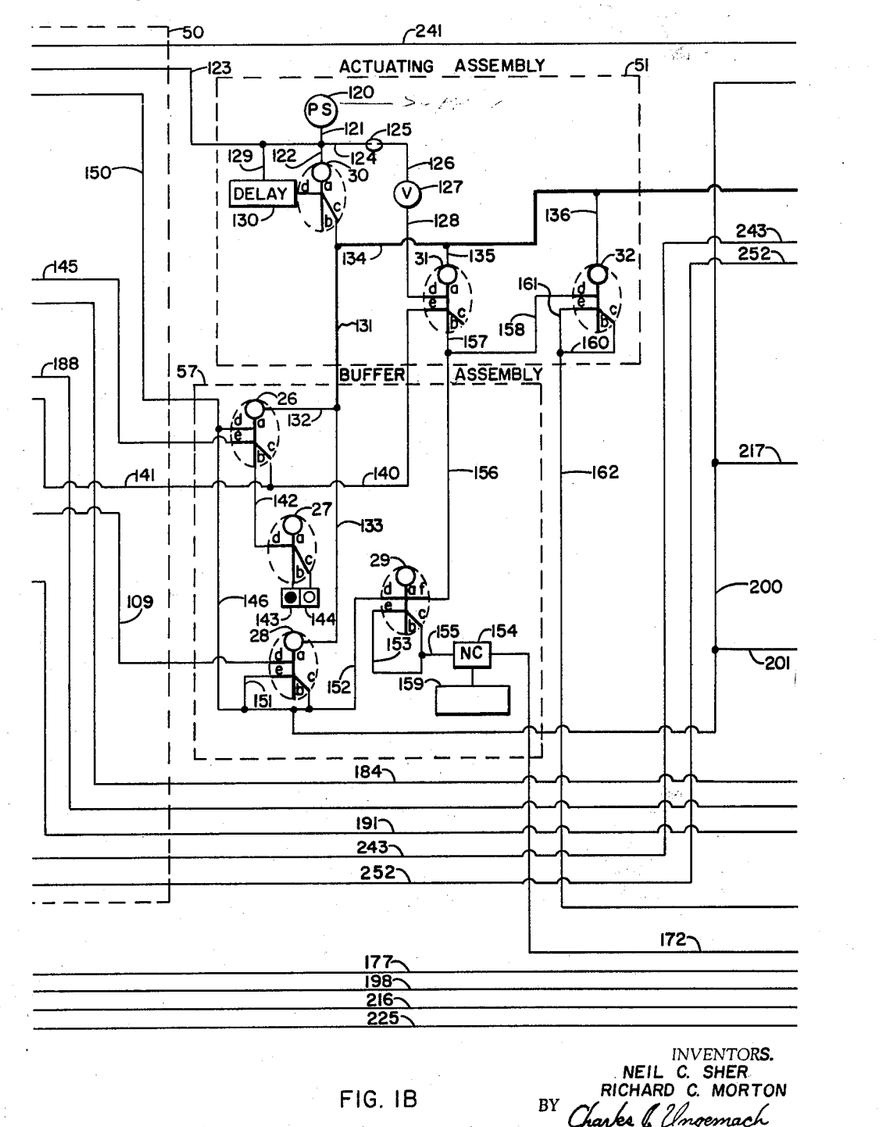
Figure 1C:
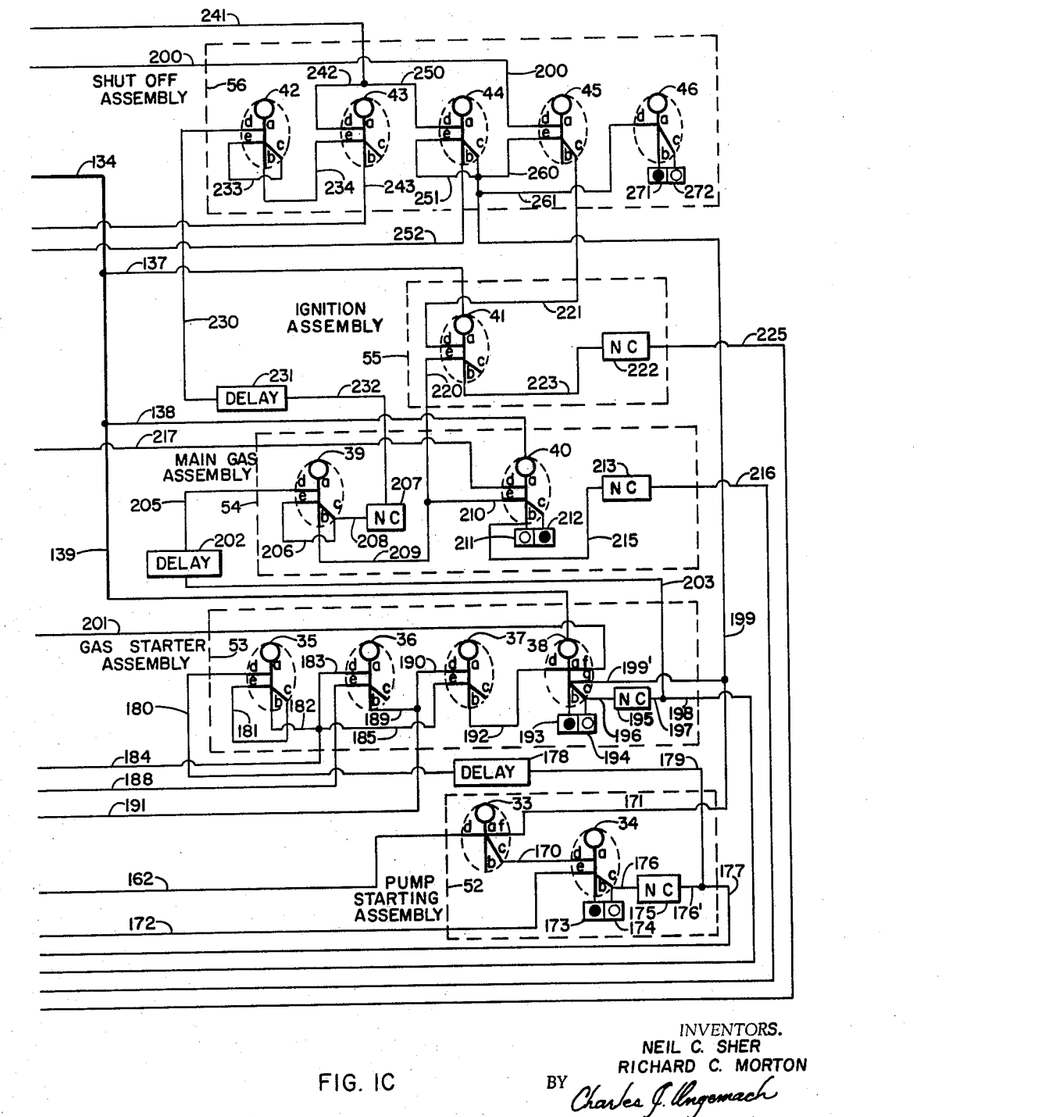

In the drawing, a compressor is shown at 8 which includes a heat engine (not shown) for driving the fluid pump. The circuit for performing the desired starting function is shown attached thereto for illustrative purposes.

A set of thirty-seven amplifiers are shown in the circuit having reference numerals 10–46 for identification purposes. Each one of the fluid amplifiers has a power nozzle indicated by a reference character $a$, a preferred outlet indicated by a reference character $b$, a second outlet port indicated by a reference character $c$, a first control port indicated by a reference character $d$, for causing the stream from the power nozzle $a$ to emerge through outlet port $c$. Some of the amplifiers such as amplifiers 37 and 38 have additional control ports. These additional control ports are identified in the following manner: a second control port indicated by reference character $e$ for causing the stream from the power nozzle $a$ to emerge through outlet $c$, a third control port indicated by reference character $f$ for causing the stream from the power nozzle $a$ to emerge through outlet $b$ and a fourth control port indicated by reference character $g$ for causing the stream from the power nozzle $a$ to also emerge through outlet $b$. Reference hereinafter to a particular element of a fluid amplifier will be by fluid amplifier identification number and by reference character of the particular element. For example, the preferred outlet port $b$ of fluid amplifier 35 will be referred to as outlet 35$b$.

Symbols conventional in electrical circuitry are resorted to in the drawing to distinguish between instances where conduits interconnect and instances where they cross without interconnection.

The circuit is divided into eight sections for ease in understanding the functions performed by the various sections of the circuit. These sections are: a sensing assembly 50, which is similar to the circuit disclosed in the aforementioned copending aplication, for indicating the first-to-fail of a plurality of engine parameters; an actuating assembly 51 for actuating the control system; a pump starting assembly 52 for starting the lube pump; a gas starter assembly 53 for opening a gas starter valve; a main gas assembly 54 for opening a main gas valve; an ignition assembly 55 for closing the ignition switch; a shutoff assembly 56 for shutting off the ignition switch 7, the lube pump 4, and closing the gas starter valve 5; and a buffer assembly 57, which acts as a buffer between the sequencing portion of circuit means 51–56 and the sensing assembly 50.

Associated with the compressor 8 is: a fuel gas pressure sensor 60 which supplies a fluid to control port 10d through a conduit 61 and a fluid resistor 62 if the gas pressure of the system is within a normal range of values; a prelube oil pressure sensor 63 which supplies a fluid to control port 11e through a conduit 64 and a fluid resistor 65 if the oil pressure is in the normal range of values prior to starting of the engine; a vibration sensor 66 which supplies a fluid to control port 12d through a conduit 67 and a fluid resistor 68 if the engine vibration is not excessive; and a lube oil pressure sensor 69 which supplies a fluid to control port 13e through a conduit 70 and a fluid resistor 71 if the lube oil pressure during the running of the engine is within a normal range of values.

The fluid amplifiers 10, 11, 12, and 13, which are the first to sense that a parameter has reached an abnormal value, are powered by a fluid amplifier 14 through a main power conduit 72 (shown as one of the heavy lines on the drawing) and sub-conduits 73, 74, 75, and 76 respectively. A fluid amplifier 16, which will be shown to supply a signal to outlet 16c if the engine fails to start, is likewise powered by fluid amplifier 14 through main power conduit 72 and a sub-conduit 77. The other fluid amplifiers 15, 17, 18, 19, 20, 21, 22, 23, 24, and 25 in sensing assembly 50 are powered by a source not shown in the drawing.

Although the sensing assembly 50 does not comprise a part of this invention, a brief description of its operation is necessary because of its coaction with the present invention. For purposes of describing the operation of the sensing assembly, it will be assumed that the engine and compressor are operating in a normal manner. All the fluid amplifiers in the sensing assembly are powered and when one of the parameters reaches an extreme value, it calls for a shutdown of the engine and compressor.

When the engine and compressor are operating properly, all the fluid amplifiers within the sensing assembly 50 are exhausting a fluid through the preferred outlet ports b with the exception of fluid amplifiers 10, 11, 12, and 13, which are exhausting fluid through outlets 10c, 11c, 12c, and 13c respectively.

In order to have a visual indication that the engine and compressor are operating properly, a series of indicators are connected to the outlet ports b and c of fluid amplifiers 15, 17, 19, 22, 24, and 25. The visual indicators may be those of the type shown in copending application Ser. No. 528,203, filed Feb. 17, 1966, now Patent 3,357,638, and assigned to the assignee of the present invention.

A first visual indicator 80 is connected to 15b and a second visual indicator 81 is connected to 15c. When the fluid within amplifier 15 is flowing in outlet 15b, a conspicuously colored spool within indicator 80 is visible at the front of the indicator. Conversely, when no fluid signal is present in outlet port 15b, the spool located in indicator 80 is not visible at the front of the indicator. None of the other indicators will be described since they are structurally similar and operate in a similar manner.

With the compressor operating properly, indicators 82, 83, 84, 85, and 86 will all have the conspicuously colored spool showing in the front thereof because the fluid signal within fluid amplifiers 17, 19, 22, 24, and 25 is flowing in preferred outlet ports 17b, 19b, 22b, 24b, and 25b respectively. Likewise, indicators 87, 88, 89, 90, and 91 will not show any conspicuously colored spool in the front thereof since there is no fluid signal present in the fluid amplifier outlet ports 17c, 19c, 22c, 24c, and 25c respectively.

A series of feedback paths 92, 93, 94, 95, and 96 are shown in fluid amplifiers 17, 19, 22, 24, and 25 respectively for performing a "latching" function. That is, when a signal is applied at control port d in the amplifiers having a feedback path, a signal is sent from outlet c to control port e that keeps the power stream from power nozzle a flowing into outlet c even though the original signal applied at control port d has been removed.

Suppose now, that when the compressor is running, one of the parameters such as engine vibration, assumes an extreme value causing termination of the fluid signal from vibration sensor 66. The signal supplied to control port 12d through the conduit 67 and the fluid resistor 68 will therefore, be interrupted. When this occurs, the fluid stream within power nozzle 12a will flow out preferred outlet port 12b into control port 18d (through conduits 101 and 103) and control port 22d (through conduits 101 and 102). The fluid signal present in control port 22d causes the fluid stream in power nozzle 22a to flow out outlet port 22c causing indicator 84 to retract the conspicuously colored spool so that no visual indication of the presence of the spool is observed, and indicator 89 to have the conspicuously colored spool brought forward so that it can be visually observed at the front of indicator 89. The operator thus will be informed by indicators 84 and 89 that engine vibrations have assumed an extreme value, causing a fail signal to be generated in amplifier 12.

The fluid signal present in control port 18d causes the fluid stream within power nozzle 18a to flow in outlet 18c. Fluid flows from outlet 18c through a conduit 104 into control port 20e causing the fluid flowing from power nozzle 20a to flow into outlet 20c. Fluid flows from outlet 20c through a conduit 105 into control port 23d thus causing the fluid flowing in power nozzle 23a to flow out outlet port 23c. The fluid signal now present at outlet 23c is sent through conduits 106 and 107 to control port 14d causing the fluid stream flowing from power nozzle 14a to switch from preferred outlet 14b to outlet 14c resulting in termination of the fluid power signal supplied to fluid amplifiers 10, 11, 12, 13, and 16, thus preventing the sensing assembly 50 from indicating that any other engine parameters have assumed extreme values. In other words, the sensing assembly 50 indicates the first parameter of the engine and compressor 8 to fail. The operator is informed of the abnormal condition in the engine and compressor 8 through the appearance of the conspicuously colored spool in indicator 81 caused by the fluid flowing from outlet 14c to control port 15d through a conduit 108.

The fluid signal at outlet 23c can be sent to means for shutting down the engine (not shown) in addition to being supplied to control port 28d through a conduit 109, as in the present invention. The fluid signal in control port 28d causes the sequence of prerun events to stop, an effect which will be explained later in describing the invention.

If the lube oil pressure assumed an extreme value, the same general occurrence of events in sensing assembly 50 would occur. Namely, a fluid signal would be generated at outlet 13b which would be transmitted through conduits 110 and 111 to control port 18e causing fluid amplifier 18 to transmit a fail signal through amplifiers 20 and 23 to amplifier 14 causing the power to be terminated in amplifiers 10, 11, 12, 13, and 16. A signal would also be transmitted through a conduit 112 to control port 24d thus causing the conspicuously colored spool in indicator 85 to become hidden from view while causing the conspicuously colored spool in indicator 90 to become visible as an indication of the lube oil pressure failure.

This briefly explains the operation of the sensing assembly or alarm system, and a more thorough explanation of its operation may be had by referring to the first-named copending application.

Associated with sensing assembly 50 is an actuating assembly 51 for actuating the sequencing system of the present invention. Actuating assembly 51 comprises a power supply 120 for supplying a fluid as follows: to amplifier 30 through a conduit 121 and a conduit 122; to fluid amplifier control port 31d through conduit 121, a conduit 124, a fluid resistor 125, a conduit 126, a valve 127, and a conduit 128; and to fluid amplifier 14 through conduit 121 and a conduit 123. Connected to conduit 123 by conduit 129 is a delay device 130 which is connected to control port 30d. Delay device 130 comprises a chamber of predetermined volume having a small inlet orifice and a smaller outlet orifice so that the chamber requires a certain amount of time to build up a pressure sufficient to cause a fluid stream within fluid amplifier 30 to transfer its fluid from outlet 30b to outlet 30c.

Outlet 30c supplies power to fluid amplifier 26 through a main conduit 131 (shown as a heavy line in the drawing) and a conduit 132, and power to fluid amplifier 28 through conduit 131 and a conduit 133. Connected to conduit 131 is a main conduit 134 (likewise shown as a heavy line in the drawing) that supplies power as follows: to fluid amplifier 31 through a sub-conduit 135, to fluid amplifier 32 through a sub-conduit 136; to fluid amplifier 41 through a sub-conduit 137; to fluid amplifier 40 through a sub-conduit 138; and to fluid amplifier 38 through a sub-conduit 139.

Buffer assembly 57, which acts as a buffer between sensing assembly 50 and the rest of the invention is connected to the actuating assembly 51 by a fluid conduit 140 connecting the fluid amplifier outlet port 26c to fluid amplifier control port 31e. Fluid amplifier outlet port 26c is also connected to sensing assembly 50 and fluid amplifier control port 20d through a conduit 141. Amplifier 26 has preferred outlet port 26b connected to fluid amplifier control port 27d by a conduit 142. Amplifier 27 is connected to indicators 143 and 144 for giving an indication of the presence or absence of a signal in outlet ports 27b or 27c. Fluid amplifier 26 switches its fluid output from its preferred port 26b to its nonpreferred port 26c when a signal is transmitted through a conduit 145 from fluid amplifier outlet 10b or when a signal is present at control port 26d. Fluid amplifier control port 26d is connected to fluid amplifier outlet port 28c, through a conduit 146. Outlet port 28c is further connected to fluid amplifier control port 14e through conduit 146 and a conduit 150.

Amplifier 28 is responsive to a fail condition from the sensing assembly 50 which is transmitted through the conduit 109 to fluid amplifier control port 28d. A fail signal from the sensing assembly 50 causes the fluid stream within power nozzle 28a to flow into outlet 28c, thereby causing a positive feedback signal to be generated in control port 28e through conduit 151. This positive type of feedback is referred to as a "latching" type of arrangement. The result of this "latching" type of arrangement is that the fluid will continue to flow out outlet port 28c even though the control signal is removed from control port 28d. The outlet 28c is further connected to fluid amplifier control port 29d through a conduit 152. Amplifier 29 also has a "latching" function performed through conduit 153, similar to that provided for fluid amplifier 28.

Amplifier 29 operates to control a normally closed fluid valve 154 through a conduit 155. Normally closed valve 154 comprises a mechanism for causing fluid to flow from fluid storage tank 159 into a conduit 172 in response to a low pressure signal in conduit 155. Fluid amplifier outlet port 29c is also connected to control port 29e to cause a fluid stream to "latch" into the outlet port 29c. Control port 29f is connected to fluid amplifier outlet port 31b through conduits 156 and 157. Control port 29f is also connected to fluid amplifier control port 32d through conduit 156 and a second conduit 158.

If the engine and compressor should be shut down due to a parameter reaching an abnormal value, the lube pump is started by the signal at fluid amplifier outlet 29c, and is kept running by a signal of predetermined duration from a fluid storage tank 159, which passes through normally closed valve 154 and conduit 172 into fluid amplifier control port 34e. The fluid amplifier 34, in response to the signal at control port 34e, sends a signal through a conduit 176, a normally closed valve 175, a conduit 176' and a conduit 177 which starts lube pump 4. The starting of the lube pump after shutdown insures that the engine and compressor will be properly lubricated when restarting is attempted.

Fluid amplifier 32 is also arranged to supply a fluid signal to the pump starting assembly 52. Fluid amplifier outlet port 32c is connected to control port 32e through conduits 160 and 161 so that a positive feedback signal is generated in control port 32e resulting in "latching." Conduit 160 is also connected to fluid amplifier control port 33d through a conduit 162.

Pump starting assembly 52 comprises two fluid amplifiers 33 and 34 for sending a signal to activate the lube pump 4. Outlet port 33c is connected to fluid amplifier control port 34d through a conduit 170. Fluid amplifier control port 33f is connected to fluid amplifier outlet 44c through a conduit 171 and a conduit 199. A set of indicators 173 and 174 are connected to the outlets 34b and 34c respectively of fluid amplifier 34 to indicate whether the lube pump has been started. Normally closed valve 175 is also connected to a delay device 178 through the conduit 176' and a conduit 179. Delay device 178 is similar in structure and operation to delay device 130 and will not be described herein.

Gas starter assembly 53 for activating the gas starter valve 5 comprises four fluid amplifiers 35, 36, 37, and 38. Fluid amplifier 35 has a first control port 35d connected to delay device 178 through a conduit 180. Fluid amplifier outlet port 35c is connected to control port 35e through a conduit 181 to accomplish "latching." Outlet port 35b is connected to fluid amplifier control port 36d through conduits 182 and 183. Outlet port 35b is connected to fluid amplifier control port 11d through conduit 182 and a conduit 184. Outlet port 35b is also connected to fluid amplifier control port 37e through conduit 182 and a conduit 185.

Fluid amplifier 36 has a control port 36e connected to outlet port 11c through a conduit 188. Outlet port 36b is connected to control port 37d through a conduit 189 and a conduit 190. Conduits 189 and 190 are also connected to fluid amplifier control port 21e through a conduit 191. Fluid amplifier outlet port 37b is connected to fluid amplifier control port 38d through a conduit 192.

Fluid amplifier 38 has a set of indicators 193 and 194 attached to outlet ports 38b and 38c respectively to indicate whether the gas starter valve 5 is open or closed. Outlet port 38c is connected to a normally closed valve 195 through a conduit 196. Normally closed valve 195 is connected to gas starter valve 5 through a conduit 197 and a conduit 198. Normally closed valve 195 is also connected to a delay device 202 through a conduit 203 and conduit 197. Control port 38g is connected to fluid amplifier outlet 44c through the conduit 199 and a conduit 199'. Control port 38f is connected to a conduit 200 through a conduit 201. Conduit 200 supplies a shutdown signal to the system if amplifier 28 should exhaust fluid out of outlet 28c.

Main gas assembly 54 for turning on the main gas valve 6 comprises two fluid amplifiers 39 and 40. Fluid amplifier control port 39d is connected to delay device 202 through a conduit 205. Outlet 39c is connected to control port 39e through a conduit 206 to provide "latching." Outlet 39c is further connected to normally closed valve 207 through a conduit 208. Outlet port 39b is connected to control port 40e through a conduit 209 and a conduit 210.

Fluid amplifier 40 has a set of indicators 211 and 212 connected to outlet ports 40b and 40c respectively. Outlet port 40b is connected to a normally closed valve 213 through a conduit 215. Normally closed valve 213 is connected to main gas valve 6 through a conduit 216. Control port 40d is connected to conduit 200 through a conduit 217.

Ignition assembly 55 for igniting the gas in the engine comprises a fluid amplifier 41. Control port 41e is connected to control port 40e through conduit 210 and a conduit 220. Control port 41d is connected to fluid amplifier outlet port 45c through a conduit 221. Outlet port 41b is connected to a normally closed valve 222 through a conduit 223. Normally closed valve 222 is connected to ignition 7 for the compressor 8 through a conduit 225.

Shutoff assembly 56 for terminating unwanted signals when startup in the engine occurs comprises a series of five fluid amplifiers 42, 43, 44, 45, and 46. Amplifier 42 has control port 42d connected to normally closed valve 207 through a conduit 230, a delay device 231, and a conduit 232. Control port 42e is connected to outlet port 42c through a conduit 233 to provide "latching." Outlet 42b is connected to control port 43e through a conduit 234. Fluid amplifier control port 43d is connected to a run sensor 240, that supplies a fluid signal if the compressor 8 is running, through a conduit 241 and a conduit 242. Outlet 43b is connected to fluid amplifier control port 16d through a fluid conduit 243.

Fluid amplifier 44 has control port 44d connected to run sensor 240 through conduit 241 and a conduit 250. Control port 44e is connected to outlet port 44c through a conduit 251 to provide "latching." Outlet 44b is connected to fluid amplifier control port 13d through a conduit 252 and a conduit 253. Fluid amplifier outlet 44b is also connected to control port 12e through conduit 252 and a conduit 255. Outlet 44c is connected to control port 45e through a conduit 260. Outlet 44c is further connected to control port 46d through a conduit 261.

Fluid amplifier control port 45d is connected to fluid conduit 200. Outlet port 45c is connected by conduit 221 to fluid amplifier control port 41d.

Amplifier 46 powers a pair of indicators 271 and 272, in response to signals from fluid amplifier outlet port 44c.

OPERATION

In the normal operating condition of the fluidic circuit, all the fluid amplifiers are powered. However, in order to insure that the fluid amplifiers are exhausting fluid in their proper outlet ports, it is necessary to power the fluid amplifiers in a predetermined order. For example, the set of fluid amplifiers 15, 17, 18, 19, 20, 21, 22, 23, 24, 25, 27, 29, 33, 34, 35, 36, 37, 39, 42, 43, 44, 45, and 46 are powered first by a source not shown on the drawing. The powered fluid amplifiers 15, 17, 18, 19, 20, 21, 22, 23, 24, and 25 in the sensing assembly 50, have a fluid stream flowing from their respective power nozzles into their respective preferred outlet ports b. The fluid stream present in fluid amplifier preferred outlet ports 15b, 17b, 19b, 22b, 24b, and 25b respectively cause the conspicuously colored spool within indicators 80, 82, 83, 84, 85, and 86 to be visible at the front face of the indicators.

Fluid amplifiers 27 and 29 in buffer assembly 57 have fluid emerging from outlet 27b and indicates a nor- and 29b respectively. Indicator 143 is activated by the fluid emerging from outlet 27b and indicates a normal condition for starting by the presence of the conspicuously colored spool visible at the front face of indicator 143.

Fluid amplifiers 33 and 34 in the pump starting assembly 52 have their fluid power stream emerging through outlet ports 33b and 34b respectively. Indicator 173 is activated by the fluid emerging through outlet port 34b and indicates the lube pump is not running by the presence of a conspicuously colored spool at the front face of indicator 173.

The fluid amplifiers 35, 36, and 37 in gas starter assembly 53 have their fluid power streams emerging in the following manner: fluid flows from outlet port 35b into control port 36d through conduits 182 and 183, and also into control port 37e through conduits 182 and 185 as well as into fluid amplifier control port 11d through conduits 182 and 184. The fluid signal present in control port 11d disables the prelube oil sensor for a predetermined length of time during starting of the engine. This is necessary because oil pressure during starting is normally at a level that would cause the prelube oil sensor to indicate that a fault is present in the engine by removing the signal at control port 11e. Without the signal at control port 11d, fluid supplied to control port 11a would flow in outlet 11b which would result in shutdown of the engine. The fluid signals present in control ports 36d and 37e cause the fluid streams flowing in fluid amplifier power nozzles 36a and 37a to emerge through outlet ports 36c and 37c respectively. Fluid amplifier 38 is not yet powered, and is one of the last fluid amplifiers to be powered.

Fluid amplifier 39 in the main gas assembly 54 has a fluid stream emerging through outlet port 39b into conduit 209 and therefrom to fluid amplifier control port 40e through conduit 210. A fluid signal is also sent from outlet port 39b to fluid amplifier control port 41e through conduits 209 and 220. Fluid amplifier 40 is not presently powered, but when a power signal is supplied to power nozzle 40a it will be diverted to outlet 40c by the fluid signal present in control port 40e. Likewise, fluid amplifier 41 is not powered but when a power signal is present in power nozzle 41a, the control signal at control port 41e directs the power stream out port 41c.

Fluid amplifiers 42, 43, 44, 45, and 46 in the shutoff assembly 56 are powered. The fluid stream in fluid amplifier 42 is emerging from outlet port 42b and is transmitted to control port 43e through conduit 234. Consequently, fluid flowing in fluid amplifier power nozzle 43a will be diverted into outlet 43c. The fluid stream in amplifier 44 emerges through outlet port 44b and flows into conduit 252 and therefrom into fluid amplifier control port 13d through conduit 253 and into fluid amplifier control port 12e through conduit 255. Fluid amplifiers 12 and 13 are not yet powered but the signal present in fluid amplifier outlet port 44b insures that when the fluid stream is supplied to fluid amplifier power nozzles 12a and 13a it is diverted into outlet ports 12c and 13c respectively. Accordingly, the presence of the fluid signal in control ports 12e and 13d prevents fail signals calling for engine shutdown from vibration sensor 66 or lube oil pressure sensor 69, during starting of the compressor 8.

The next set of fluid amplifiers to be powered are fluid amplifiers 14, 10, 11, 12, 13, 16, and 30, which are powered by fluid from fluid power supply 120. Fluid amplifier 14 is powered through conduits 121 and 123 and has its fluid power stream emerging from outlet port 14b and flowing into fluid amplifier power nozzles 10a, 11a, 12a, 13a, and 16a through main conduit 72 and sub-conduits 73, 74, 75, 76, and 77 respectively. As previously mentioned, signals are present in the control ports 11d, 12d, and 13d as well as in control port 10d, which causes the fluid streams flowing into fluid amplifiers 10, 11, 12, and 13 to exhaust out their respective outlet ports 10c, 11c, 12c, and 13c, thus preventing fail signals from being sent, calling for the engine shutdown. There is no signal present in control port 16d, hence the fluid flowing in power nozzle 16a will exhaust through preferred outlet port 16b. The fluid stream flowing from outlets 10c, 12c, 13c, and 16b are vented to the surrounding atmosphere but the fluid stream at outlet port 11c is transmitted through conduit 188 into fluid amplifier control port 36e. It will be recalled that there is a fluid signal already present in control port 36d from outlet port 35b and the fluid in amplifier 36 is already flowing in outlet 36c so that the fluid signals supplied to control port 36e has no additional affect. The signal in control port 36d is removed when the gas starter valve is opened, as will be explained later.

The fluid from power source 120 also flows into power nozzle 30a to cause the fluid power stream to exhaust to the atmosphere through outlet port 30b. The fluid from power supply 120 also flows through conduit 124, fluid resistor 125, conduit 126, valve 127, and conduit 128, into fluid amplifier control port 31d.

After a predetermined time delay, the fluid signal presented to the delay device 130 via conduits 121, 123, and 129 is transmitted to fluid amplifier control port 30d causing the fluid flowing from power nozzle 30a to be transferred from outlet 30b into outlet 30c. This transfer of fluid to outlet 30c powers fluid amplifier 26 through conduits 131 and 132 as well as fluid amplifier 28 through conduits 131 and 133. Likewise, fluid amplifier 31 is powered through conduits 134 and 135, and fluid amplifier 32 is powered through conduits 134 and 136. Fluid amplifiers 38, 40, and 41 are also powered through main conduit 134 and sub-conduits 139, 138, and 137 respectively.

With the presence of a power fluid within power nozzle 26a, and no control signals on control ports 26d or 26e, the fluid flows out of the preferred outlet port 26b and into control port 27d causing the fluid within power nozzle 27a to be transferred from outlet 27b into outlet 27c, resulting in the conspiciously colored spool within indicator 143 being retracted from visual observation and the conspicuously colored spool in indicator 144 becoming visible.

Since there are no control signals indicating a parameter has reached an extreme value present in fluid amplifier control ports 28d and 28e, the fluid that is applied to power nozzle 28a is directed out preferred outlet 28b.

The fluid stream supplied to fluid amplifier 31 is directed through outlet port 31c, because there is a fluid signal present in control port 31d which is supplied through conduit 128, valve 127, conduit 126, fluid resistor 125, fluid conduit 124, and fluid conduit 121 from the fluid power source 120. The fluid supplied to power nozzle 32a is directed out preferred outlet 32b, because there are no signals present in the sensing assembly 50 indicating that a parameter has reached an abnormal value calling for shutdown of the engine.

The power fluid supplied to power nozzle 41a is directed out outlet port 41c, because there is a signal present in control port 41e from fluid amplifier outlet port 39b.

Fluid amplifier 40 after being powered diverts its fluid power stream out outlet port 40c, because it has a signal present in control port 40e as a result of the fluid flowing from outlet port 39b. Consequently, the conspicuously colored spool in indicator 212 becomes visible.

Fluid amplifier 38 directs its power fluid stream into outlet port 38b because there is no signal present on fluid amplifier control port 38d. Consequently, the conspicuously colored spool in indicator 193 is visible.

With the fluidic system powered as described, and the fluid amplifier power streams exhausting in the proper outlet ports, the fluidic system is in a state of readiness to cause a series of prerun events to occur that will automatically terminate in the starting of the engine, provided that the fuel gas pressure was maintained within an acceptable range of values, and that all of the other monitored parameters have acceptable values at the end of the sequence of prerun events.

In summary, a fluid signal is present in fuel gas pressure sensor 60, which is transmitted to fluid amplifier 10 through conduit 61 and fluid resistor 62. This signal in fuel gas pressure sensor 60 indicates that there is fuel or gas pressure in the line that is sufficient to start the compressor 8. The prelube oil pressure sensor is not sending a fluid signal during the initial phase of startup, because the oil pressure builds up as the engine speed builds up. However, to prevent the absence of a signal in fluid amplifier control port 11e from preventing the system from starting up, a signal is provided in control port 11d rendering amplifier 11 inoperative to fail signals from the prelube oil sensor during the initial startup of the engine. Likewise, the excess vibration sensor and lube oil sensor are required to be rendered in operative during the starting operating of the engine, since excess vibrations normally do occur during startup and oil pressure does not build up to a sufficient level until the engine is running. The oil pressure sensors 63 and 69 complement each other, that is, sensor 63 monitors the oil pressure during startup of the engine, while pressure sensor 69 monitors the pressure during the running of the engine.

When the fluid amplifiers are powered in the aforedescribed manner, and fluid amplifiers 11, 12, and 13 of the sensing assembly 50 are disabled so that no fail signals are sensed during starting of the engine, the operator can manually activate valve 127 which will result in the following sequence of prerun events: (1) starting the lube pump 4, (2) opening the gas starter valve 5, (3) opening the main gas valve 6, (4) igniting the gas in the engine at ignition 7, and (5) shutting off the lube pump 4, closing the gas starter valve 5, and shutting off the ignition 7 when the engine starts running.

To activate the sequencing system and start the sequence of prerun events, the operator momentarily closes valve 127 causing an interruption in the fluid flowing from fluid power source 120 into fluid amplifier control port 31d. The momentary interruption of fluid in control port 31d causes the fluid stream flowing from power nozzle 31a into outlet 31c to be momentarily transferred into outlet 31b. The momentary signal in outlet 31b is transmitted into control port 32d through conduits 157 and 158. The momentary signal at control port 32d causes the fluid stream flowing from power nozzle 32a to transfer from outlet 32b into outlet 32c. The fluid flowing from outlet 32c is directed by conduits 160 and 161 back into control port 32e resulting in the "latching" function, that is, there is present in the control port 32e a positive feedback signal of sufficient strength to move the fluid stream emanating from power nozzle 32a so that it continues to flow in the outlet 32c even though the momentary signal that is applied at control port 32d is removed.

If the fuel gas pressure assumes an extreme value prior to the momentary interruption of fluid in control port 31d, a fail signal, indicated by the presence of a fluid signal at the fluid amplifier outlet 23c, is transmitted from outlet 23c through conduits 106 and 109 into control port 28d causing fluid to flow into outlet 28c which is then transmitted through conduit 146 to control port 26d, causing the fluid flowing in power nozzle 26a to flow into outlet 26c which is transmitted through conduit 140 to control port 31e. If a signal is present in conduit 140, the temporary removal of the signal at control port 31d by momentarily closing valve 127, does not transfer the fluid stream from outlet 31c to outlet 31b. In other words, the sequence of the prerun events could not be initiated, since fluid amplifier 31 would not transmit a fluid signal to outlet 31b.

Under normal starting conditions, momentary fluid signal applied by closing valve 127 is also transmitted from outlet 31b through conduits 157 and 156 to control port 29f, so as to reset or "unlatch" fluid amplifier 29. The reason for this is that whenever the system is shutdown by the failure of one of its parameters, it is desired that the lube pump 4 keep running for a predetermined time. This is accomplished by the "latching" of amplifier 29 upon system failure so that fluid will continue to flow from outlet port 29c into conduit 155 and hold the normally closed valve 154 open. When valve 154 is open, fluid will flow from the storage tank 159 into conduit 172 for a predetermined time as desired. Thus, the output from amplifier 34 will be switched to 34c and a signal keeping the lube pump 4 operating will be transmitted through conduit 177. After the fault is repaired and it is desired to start the compressor again, the signal from 29c must be stopped. The signal to control port 29f accomplishes this result by switching the output from amplifier 29 into output port 29b.

After receiving the momentary fluid signal from fluid amplifier 31, fluid amplifier 32 continues to exhaust its fluid stream from outlet 32c until the system is shutdown and restarted again. The fluid flowing from outlet 32c flows through conduit 160 into conduit 162 and therefrom into fluid amplifier control port 33d. The fluid stream in control port 33d causes the fluid stream flowing from power nozzle 33a to be transferred into outlet 33c. The fluid signal from outlet 33c is transmitted through conduit 170 into fluid amplifier control port 34d causing the fluid stream flowing from nozzle 34a into outlet 34b to be transferred to outlet 34c. When the fluid transfers from outlet 34b to outlet 34c, the indicators 173 and 174 so indicate by the presence of a conspicuously colored spool near the face of indicator 174 and the absence of a conspicuously colored spool near the face of indicator 173. The fluid signal at outlet 34c is also transmitted through conduit 176 to the normally closed valve 175 that opens when a fluid signal is present in conduit 176 causing a fluid signal to be transmitted through conduits 176' and 177 into the lube pump 4. The signal in the lube pump 4 starts the lube pump operating thereby building up the oil pressure in the compressor 8. The first prerun event has now been completed; namely, the starting of the lube pump. The second prerun event will occur after a predetermined length of time, determined by the delay device 178. That is, the fluid signal from fluid amplifier outlet 34c starts the lube pump as well as setting into operation the second prerun event after the fluid signal from outlet 34 passes through delay device 178.

The fluid signal in outlet 34c that causes the second prerun event to occur is transmitted through conduit 176, normally closed valve 175, conduit 176', conduit 179, delay device 178, and conduit 180 to fluid amplifier control port 35d causing the fluid stream in fluid amplifier power nozzle 35a to be transferred from outlet 35b to outlet 35c. Transferring of the fluid stream from outlet 35b to outlet 35c causes the fluid signal to be removed from fluid amplifier control ports 36d, 37e, and 11d. If the system is still operating properly, the prelube oil pressure increases because the lube pump is running and a fluid pressure signal indicative of the oil pressure is sent from sensor 63 through conduit 64 and fluid resistor 65 into fluid amplifier control port 11e. If the fluid pressure signal from sensor 63 is of a sufficient pressure level, the fluid stream continues to flow from fluid amplifier power nozzle 11a into outlet 11c, even though the signal applied at 11d has been removed. In other words, the deactivated fluid amplifier 11 in sensing assembly 50 is put in a ready state so that fluid amplifier 11 is able to determine if the prelube oil pressure has achieved a normal value and if the sequence of prerun events is allowed to continue.

The transfer of the fluid stream from outlet 35b to outlet 35c does not cause fluid amplifier 36 to transfer the fluid stream from outlet 36c to outlet 36b, because as mentioned previously the prelube oil pressure has achieved a normal value thus preventing fluid amplifier 11 from switching. That is, the fluid signal at fluid amplifier outlet 11c is transmitted through conduit 188 to control port 36e, thus maintaining the fluid stream flowing from power nozzle 36a into outlet 36c.

The removal of the fluid signal in conduits 182 and 185 by transfer of the fluid from outlet 35b to outlet 35c results in the transfer of the fluid within fluid amplifier 37 from outlet 37c to outlet 37b. The fluid signal generated in outlet 37b is transmitted to control port 38d through conduit 192 causing the fluid flowing from power nozzle 38a to transfer from outlet 38b to outlet 38c, which is indicated by the appearance of a conspicuously colored spool at the face of indicator 194 and the absence of a conspicuously colored spool at the face of indicator 193. The transfer of the fluid stream in fluid amplifier 38 from outlet 38b to outlet 38c also results in a signal in conduit 196 opening normally closed valve 195. From normally closed valve 195, a signal is transmitted through conduit 198 to open a gas starter valve 5, thus, the second prerun event has been accomplished.

If, however, the prelube oil pressure had not been within a range of permissible values, when the signal to control port 11d was removed a signal would have been removed from outlet 11c, conduit 188, and control port 36e so that the fluid amplifier 36 would have transferred its flow from outlet 36c to outlet 36b, resulting in a signal in conduits 189 and 190 that would flow into control port 37d. This would cause the fluid flowing in fluid amplifier 37 to continue to flow in outlet 37c even though there was no fluid signal from outlet 35b. In other words, no signal could be transferred to fluid amplifier 38 to activate the second prerun event. If further, some other parameter had assumed an extreme value that would call for shutdown of the system, a signal would be transmitted from amplifier 23, through conduit 106, conduit 109, and into control port 28d, causing the fluid flowing within fluid amplifier 28 to be transferred to outlet 28c, resulting in a fluid signal being transmitted through conduits 200 and 201 and into control port 38f which would prevent the signal in control port 38d from causing the fluid stream to be transferred from outlet 38b to outlet 38c. This would then prevent amplifier 38 from starting the engine until the failure could be corrected.

If everything is operating properly, the third and fourth prerun events will occur after a predetermined length of time determined by the delay device 202. That is, the fluid signal from fluid amplifier outlet 38c in gas starter assembly 53 is transmitted to fluid amplifier control port 39d in main gas assembly 54 through conduit 196, normally closed valve 195, conduit 197, conduit 203, delay device 202, and conduit 205. The delay device 202 serves to delay the signal in a manner similar to delay device 178 and separates the prerun events in time.

Although the prerun events are separated by a time dependent on the delay device, the prerun events could also be activated by a signal from the engine such as an oil pressure signal which is dependent on the occurrence of another prerun event. The signal in control port 39d causes the fluid stream in fluid amplifier 39 to be transferred from outlet 39b and "latched" into outlet 39c, by the positive feedback path 206 connecting outlet 39c to control port 39e. The transfer of fluid from outlet 39b to outlet 39c causes an interruption of fluid flowing in conduits 209, 210, and 220 causing the fluid stream in fluid amplifier 40 to transfer from outlet 40c into outlet 40b as well as causing the fluid stream in fluid amplifier 41 to be transferred from outlet 41c to outlet 41b. The transfer of the fluid stream from outlet 40c to outlet 40b is indicated by indicators 211 and 212, which show the presence of a conspicuously colored spool at the face of indicator 211 and the absence of a conspicuously colored spool at the face of indicator 212. The fluid signal present in outlet 40b is transmitted through conduit 215 to normally closed valve 213 causing a signal to be further transmitted through conduit 216 to open main gas valve 6 for the engine. At the same time that the main gas valve 6 is opened, the absence of the fluid signal in conduit 220 and control port 41e causes the fluid stream within fluid amplifier 41 to be transferred from outlet 41c into outlet 41b, thereby causing a fluid to flow into conduit 223 and to open normally closed valve 222 resulting in a fluid signal in conduit 225 that causes ignition of the gas. Hence, the third and fourth prerun events have occurred. Namely, the main gas supply has been turned on and the ignition of the gas within the engine has taken place.

The transfer of fluid from outlet 39b to outlet 39c also causes the fluid to flow into conduit 208 and open normally closed valve 207, thus allowing fluid to flow into conduit 232 and delay device 231. After a predetermined length of time to insure that the first four prerun events have occurred, the delay device 231 transmits a signal through conduit 230 to control port 42d in shut-off assembly 56, which causes certain of the prerun events that are no longer necessary for the operation of engine to be terminated. The presence of a fluid signal in fluid amplifier control port 42d causes the fluid stream within fluid amplifier 42 to be transferred from outlet port 42b into outlet 42c. The fluid flowing from outlet 42c is directed through conduit 233 into control port 42e to "latch" the fluid stream in outlet 42c even though a signal at control port 42d may be removed. The interruption of the fluid flowing in outlet 42b removes the fluid signal from conduit 234 and control port 43e, however, attached to the engine is a run sensor 240 which generates a fluid signal when the engine begins running and transmits the fluid signal through conduit 241 to fluid amplifier control ports 43d and 44d. The presence of the fluid signal in control ports 43d insures that the fluid stream in fluid amplifier 43 continues to flow out outlet 43c, which means that no fail signal calling for and indicating a shutdown of the engine can be transmitted through conduit 243 from outlet 43b to fluid amplifiers 16 and 17. The presence of the fluid from run sensor 240 in fluid amplifier control port 44d causes the fluid stream in fluid amplifier 44 to transfer from outlet 44b to outlet 44c. The interruption of fluid flowing in outlet 44b removes the fluid signal flowing in conduit 252 and control ports 12e and 13d that had disabled amplifiers 12 and 13. That is, with the engine running, it is no longer necessary to disable the excess vibration sensor 66 and the lube oil pressure 69, since vibration and oil pressure vary within normal ranges during proper operation and only reach extreme values if a fault in the engine should occur. If the vibration and the oil pressure are at a sufficient level, the respective sensors 66 and 69 transmit fluid pressure signals causing the fluid flowing from fluid amplifiers 12 and 13 to continue to flow in their fluid outlets 12c and 13c. If either of these sensors do not transmit a fluid signal to fluid amplifier control ports 12d and 13e respectively, a signal is transmitted which will call for shutdown of the compressor.

However, assuming that compressor 8 is operating properly, the sequencing system will now operate to terminate certain of the prerun events, by an appropriate signal from fluid amplifier outlet 44c. The fluid signal flowing from fluid amplifier outlet 44c is transmitted to control port 44e through conduit 251 to accomplish "latching" and is also transmitted to fluid amplifier control port 46d through conduit 261 to cause the indicators 271 and 272 to register the presence of a fluid signal at outlet 46c by the absence and presence of conspicuously colored dots at the faces of indicators 271 and 272 respectively. The fluid signal from outlet 44c is also transmitted into conduit 260 and conduit 199. The fluid signal in conduit 260 is transmitted to fluid amplifier control port 45e to cause the fluid stream within fluid amplifier 45 to be transferred from outlet 45b to outlet 45c. When the transfer of fluid from 45b to 45c occurs, a fluid signal is transmitted to fluid amplifier control port 41d through conduit 221 causing the fluid stream flowing within fluid amplifier 41 to be transferred into outlet 41c, thereby shutting off the fourth prerun event, namely, the ignition. The fluid signal present at outlet 44c is also transmitted to fluid amplifier control port 38g through conduits 199 and 199' causing the fluid stream within fluid amplifier 38 to be transferred from outlet 38c to outlet 38b and thus interrupting the fluid stream flowing into conduit 196, normally closed valve 195, and conduits 197 and 198 to thereby cause the second prerun event to be terminated, namely, the closing of the gas starter valve. The fluid flowing from outlet 44c is also transmitted to fluid amplifier control port 33f through conduits 199 and 171. The fluid signal in control port 33f causes the fluid stream within amplifier 33 to be transferred from outlet 33c to outlet 33b.

This transfer of fluid from outlet 33c to outlet 33b interrupts the fluid flowing in conduit 170, and causes fluid amplifier 34 to switch to its preferred outlet 34b because there are no signals present at control ports 34d or 34e. The removal of the signal from outlet 34c, conduit 176, normally closed valve 175, conduit 176', and conduit 177 results in termination of the first prerun event; namely, shutting off of the lube pump since the compressor is now running and supplying its own oil pressure. The main gas assembly 54 is not affected by the operation of shutoff assembly 56 since the main gas valve 6 should obviously remain open while compressor 8 is running.

In summary, a first signal activates a lube pump, a second signal opens a gas starter valve, a third signal opens a main gas valve, a fourth signal ignites the fuel, and after occurrence of these four prerun events, an additional signal is sent from shutoff assembly 56 terminating the operation of the lube pump, shutting off the gas starter valve, and turning off the ignition, since these are not necessary to operation of the system. Thus, it can be seen that the sequencing system shown in the subjoined drawings performs a sequence of prerun events that terminates in the running of a compressor and that at various stages during these prerun events, signals could have been sent that would cause the sequence of prerun events to be stopped. It is also seen that certain parameters that normally reach extreme values during start up have been prevented from sending signals calling for shutdown during the start up. For example, engine vibration may be excessive during starting but once the engine is operating normally the vibration assumes a normal state of values that does not cause excess vibration sensor 66 to indicate an abnormal value of vibration that would necessitate shutting the system down.

While I have shown and described a specific embodiment of my invention, further modifications and improvements will occur to thos skilled in the art. I desire it to be understood, therefore, that this invention is not limited to the particular form shown.

We claim:

1. A fluidic control system for apparatus including an engine, said fluidic control system comprising:
  an actuating assembly operable to produce a first fluid signal in response to an input command;
  first fluidic control means including actuating means and deactuating means, said first fluidic control means operable to produce a second fluid signal in response to a fluid signal at the actuating means thereof and operable to terminate the second fluid signal in response to a fluid input signal at said deactuating means;
  means connecting said actuating assembly to the actuating means of said first fluidic control means so as to convey the first fluid signal thereto;
  second fluidic control means including actuating means, said second fluidic control means operable to produce a third fluid signal in response to a fluid signal at the actuating means thereof;
  delay means connecting said first fluidic control means to the actuating means of said second fluidic control means so as to convey the second fluid signal thereto;
  means operable to regulate a plurality of engine variables in response to fluid signals;
  means connecting said first and said second fluidic control means to said means operable to regulate a plurality of engine variables so as to convey the second and third fluidic signals thereto;
  means operable to sense a plurality of engine parameters and produce signals indicative thereof;
  fluidic sensing means operable to receive a plurality of input signals and to produce a fourth fluid signal in the event a predetermined one of the plurality of input signals received thereby assumes a value outside of a predetermined range of values;

means connecting said means operable to sense a plurality of engine parameters to said fluidic sensing means; and means connecting said fluidic sensing means to the deactuating means of said first fluidic control means so as to convey the fourth fluid signal thereto.

2. The fluidic control system of claim 1 wherein said means for sensing a plurality of engine parameters includes a run sensor operable to produce a fifth fluid signal, and wherein is further included:

a fluidic shutoff assembly operable to produce a sixth fluid signal in response to a fluid input signal;

means connecting said run sensor to said fluidic shutoff assembly so as to convey the fifth fluid signal thereto; and means connecting said fluidic shutoff assembly to the deactuating means of said first fluidic control means so as to convey the sixth fluid signal thereto.

3. The fluidic control system of claim 2 wherein:

said second fluidic control means further includes deactuating means operable to terminate the third fluid signal in response to a fluid input signal;

said fluidic sensing means is further operable to produce a seventh fluid signal in the event any one of the plurality of input signals received thereby assumes a value outside of a predetermined range of values; and means for connecting said fluidic sensing means to the deactuating means of said second fluidic control means is provided so as to convey the seventh fluid signal thereto.

4. The fluidic control system of claim 3 wherein said fluidic sensing means includes indicator means operable to indicate the first of the plurality of input signals received by said fluidic sensing means to assume a value outside of a predetermined range of values.

5. An improved control system for apparatus including an internal combustion engine, wherein the improvement comprises:

an actuating assembly operable to produce a fluid output signal in response to an input command;

a series of fluidic control assembly means, each including an actuation input and an output and deactuation means, each operable to produce a fluid output signal in response to a fluid actuation input signal;

delay means connecting output of preceding ones of said series of fluidic control assembly means to actuation inputs of succeeding ones of said series of fluidic control assembly means;

means connecting said actuating assembly to the actuation input of the first of said series of fluidic control assembly means;

means for regulating a plurality of engine variables in response to fluid input signals;

means for sensing a plurality of engine parameters and producing fluid signals indicative thereof;

a fluidic sensing assembly having input means and output means;

means connecting said means for sensing a plurality of engine parameters to the input means of said fluidic sensing assembly said fluidic sensing assembly operable to produce an output signal in the event an engine parameter assumes a value outside a predetermined range of values;

means connecting the output means of said fluidic sensing assembly to the deactuation means of at least one of said series of fluidic control assembly means; and means connecting the outputs of said series of fluidic control assembly means to said means for regulating a plurality of engine variables so that the engine variables are sequentially regulated in response to an input command.

6. The control system of claim 5 further including a run sensor operable to produce a fluid run signal in response to running of said internal combustion engine and means connecting said run sensor to the deactuation means of at least one of said series of fluidic control assembly means so as to convey the fluid run signal thereto.

7. The control system of claim 6 wherein said fluidic sensing assembly further includes indicator means operable to indicate the first of the plurality of engine parameters to assume a value outside of a predetermined range of values.

8. The control system of claim 7 wherein said means connecting the output means of said fluidic sensing assembly to the deactuation means of said series of fluidic control assembly means includes timing means connected to the deactuation means of at least one of said series of fluidic control assembly means.

References Cited

UNITED STATES PATENTS

| | | | |
|---|---|---|---|
| 3,260,271 | 7/1966 | Catz | 137—36 |
| 3,302,398 | 2/1967 | Taplin et al. | 137—81.5 |

WILLIAM L. FREEH, Primary Examiner